US008812357B2

(12) United States Patent
Hughes

(10) Patent No.: US 8,812,357 B2
(45) Date of Patent: Aug. 19, 2014

(54) AUTOMATED TANNING SYSTEM

(76) Inventor: Tracy Hughes, Philipsburg, PA (US)

(*) Notice: Subject to any disclaimer, the term of this patent is extended or adjusted under 35 U.S.C. 154(b) by 634 days.

(21) Appl. No.: 12/432,445

(22) Filed: Apr. 29, 2009

(65) Prior Publication Data
US 2009/0276272 A1 Nov. 5, 2009

Related U.S. Application Data

(60) Provisional application No. 61/048,772, filed on Apr. 29, 2008.

(51) Int. Cl.
G06Q 10/00 (2012.01)
G06Q 30/00 (2012.01)
G06Q 20/00 (2012.01)
G06K 5/00 (2006.01)

(52) U.S. Cl.
USPC ........ 705/14.27; 705/14.65; 705/18; 235/382

(58) Field of Classification Search
USPC ................. 705/8, 7, 14.27, 14.65; 708/18
See application file for complete search history.

(56) References Cited

U.S. PATENT DOCUMENTS

| 4,428,050 | A | * | 1/1984 | Pellegrino et al. | 250/372 |
| 4,600,009 | A |   | 7/1986 | Kramer et al. |   |
| 4,726,377 | A |   | 2/1988 | Jegers et al. |   |
| 4,729,375 | A | * | 3/1988 | Jegers et al. | 607/91 |
| 4,835,749 | A | * | 5/1989 | Welton | 368/10 |
| 4,980,900 | A |   | 12/1990 | Welton |   |
| 5,107,123 | A | * | 4/1992 | Shi | 250/372 |
| 5,363,347 | A | * | 11/1994 | Nguyen | 368/10 |
| 5,365,068 | A | * | 11/1994 | Dickerson | 250/372 |
| 5,374,825 | A | * | 12/1994 | Doty et al. | 250/372 |
| 5,557,721 | A | * | 9/1996 | Fite et al. | 705/14.1 |
| 5,725,565 | A |   | 3/1998 | Smith |   |
| 5,871,520 | A | * | 2/1999 | Nguyen | 607/88 |
| 5,971,598 | A | * | 10/1999 | Baba et al. | 700/296 |
| 7,229,467 | B2 | * | 6/2007 | Spivak | 607/88 |
| 2005/0245999 | A1 |   | 11/2005 | Dixon |   |
| 2006/0041290 | A1 | * | 2/2006 | Benoit | 607/94 |
| 2006/0118039 | A1 | * | 6/2006 | Cooper | 118/696 |
| 2006/0231567 | A1 | * | 10/2006 | Perrone | 222/2 |
| 2006/0283936 | A1 |   | 12/2006 | Piccirillo et al. |   |
| 2007/0035815 | A1 | * | 2/2007 | Edgar et al. | 359/359 |
| 2007/0197982 | A1 | * | 8/2007 | Thomason et al. | 604/289 |
| 2007/0208395 | A1 | * | 9/2007 | Leclerc et al. | 607/86 |
| 2008/0125834 | A1 | * | 5/2008 | Hendrix et al. | 607/88 |
| 2009/0125936 | A1 | * | 5/2009 | Kulasekaran et al. | 725/32 |

FOREIGN PATENT DOCUMENTS

GB WO 01/27830 * 10/1999 ............ G06F 17/60

OTHER PUBLICATIONS

Tadokoro, Taketsugu, Mechanisms of Skin Tanning in Different Racial/Ethnic Groups in Response to Ultraviolet Radiation, 2005, Journal of Investigative Dermatology (.*

* cited by examiner

Primary Examiner — Justin M Pats
Assistant Examiner — Venay Puri
(74) Attorney, Agent, or Firm — The Webb Law Firm

(57) ABSTRACT

A self-service tanning system and method allows salon owners to offer tanning customization in order to meet the personal needs of various customers and to meet the various FDA regulations associated with each state. The present invention allows salon owners to customize each tanning customer session to prevent over exposure for new patrons, while allowing patrons who are already tanning to tan at a more progressive rate. In addition to tanning customization, the present invention offers built-in safety features, payment options, and networkability.

12 Claims, 11 Drawing Sheets

AUTOMATED TANNING SYSTEM

CROSS REFERENCE TO RELATED APPLICATIONS

This application claims the benefit of U.S. Provisional Patent Application No. 61/048,772 filed Apr. 29, 2008, and entitled "Automated Tanning System," the contents of which are incorporated herein by reference.

BACKGROUND OF THE INVENTION

1. Field of the Invention

The present invention relates to tanning and, more particularly, to an automated tanning system.

2. Description of Related Art

A prior art automated vending system for use with tanning machines is the Scan-A-Tan system, for example. This system allows customers to use tanning machines 24 hours a day without supervision. The Scan-A-Tan system includes various components. A first component includes a software-based system used to dispense cards for storing monetary values. A second component includes a card activation station. A third component allows a customer to purchase additional monetary amounts, either via credit card or cash, and is configured to encode such amounts on the card. A fourth component is a card reader to allow the customer to pay for a 30 minute tanning session after scanning the card.

Such a prior art system is limited in that the tanning session time is fixed at 30 minutes. Additionally, the prior art system can only be used in non-regulated states (i.e., states that have no set FDA regulations with respect to tanning) due to the lack of safety features of such a system. It is, therefore, desirable to overcome the above problems and others by providing an automated tanning system and method that offers user-defined tanning programs, including varying intensities and durations, and provides safety features.

SUMMARY OF THE INVENTION

The present invention is a self-service tanning system and method that allows salon owners to offer tanning customization in order to meet the personal needs of various customers and to meet the various FDA regulations associated with each state. Generally, the present invention allows salon owners to customize each tanning customer session to prevent over exposure for new patrons, while allowing patrons who are already tanning to tan at a more progressive rate. In addition to tanning customization, the present invention offers built-in safety features, payment options, and networkability.

The present invention includes a method of providing a customer with a tanning session in accordance with a regulated tanning interval schedule, wherein the method includes the steps of: (a) providing a tanning system having at least a first, second, and third tanning level corresponding with a first, second, and third tanning bed, wherein the first tanning level has a lower tanning intensity than the second tanning level and the second tanning level has a lower tanning intensity than the third level; (b) identifying the customer; (c) identifying whether the customer used the first, second, or third tanning level during a previous tanning session; and (d) initiating the tanning session in accordance with the regulated tanning interval schedule establishing that the customer be permitted to use: (i) the first tanning level but not the second and third tanning level if the customer did not use the first, second, or third tanning level during the previous tanning session; (ii) the first or second tanning level but not the third tanning level if the customer used the first tanning level during the previous tanning session; (iii) the first, second, and third tanning level if the customer used the second tanning level during the previous tanning session; and (iv) the first, second, and third tanning level if the customer used the third tanning level during the previous tanning session.

The intensity may be a duration of time of a tanning session associated with the first and second tanning bed, a strength of the bulbs associated with the first and second tanning beds, or a combination thereof. The method may include the step of determining that if the customer uses the first, second, or third tanning level within a predetermined time (e.g., 24 hours, 48 hours, etc.) after the previous tanning session, then not permitting the customer to use the first, second, and third tanning level. The regulated tanning interval schedule may be overridden by an operator of the tanning system if the customer establishes that the previous tanning session occurred at a location remote from that where the first, second, and third tanning bed are located. It may be indicated to the customer when the customer is permitted to use the first, second, and third tanning level based upon a determination of when the predetermined time will have elapsed. The method may include the step of determining that if the previous tanning session occurred more than a predetermined time (e.g., 1 month, etc.) prior to the tanning session to be initiated, then automatically decreasing a customer-selectable duration of time associated with the tanning session. It may be indicated to the customer if the first, second, or third tanning levels are available to the customer. The customer may be identified by reading customer identification information from an identification card scanned by the customer.

A system for providing a customer with a tanning session in accordance with a regulated tanning interval schedule includes (a) a first, second, and third tanning bed; (b) a tanning management system connected to the first, second, and third tanning bed; and (c) a kiosk connected to the tanning management system for providing starting and stopping instructions to the first, second, and third tanning beds, wherein at least a first, second, and third tanning level correspond with the first, second, and third tanning bed, wherein the first tanning level has a lower tanning intensity than the second tanning level and the second tanning level has a lower tanning intensity than the third level, wherein the kiosk includes: (i) means for identifying a customer and identifying whether the customer used the first, second, or third tanning level during a previous tanning session; and (ii) means for displaying a user interface to the customer and receiving input therefrom; (iii) means for processing a form of payment provided by the customer to cover the cost associated with the tanning session; and (iv) means for initiating the tanning session in accordance with the regulated tanning interval schedule establishing that the customer be permitted to use: (1) the first tanning level but not the second and third tanning level if the customer did not use the first, second, or third tanning level during the previous tanning session; (2) the first or second tanning level but not the third tanning level if the customer used the first tanning level during the previous tanning session; (3) the first, second, and third tanning level if the customer used the second tanning level during the previous tanning session; and (4) the first, second, and third tanning level if the customer used the third tanning level during the previous tanning session.

The system may include means for dispensing a coupon after the system has determined that the customer has paid for a predetermined amount of tanning sessions using the system or has spent a predetermined amount of money via the system. The means for displaying a user interface to the customer may be configured to display advertising.

Generally, an automated self-service tanning system includes a kiosk for interfacing with a tanning management system connected to at least one tanning bed, the system configured to (a) identify a customer by receiving identifying input from the customer; (b) process a form of payment provided by the customer to cover the cost associated with a tanning time for the at least one tanning bed to be used by the customer; and (c) initiate a tanning session for the customer on the at least one tanning bed in accordance with a regulated tanning interval schedule, wherein the regulated tanning interval schedule is comprised of a plurality of progressive tan levels of increasing tanning intensity, wherein the tanning session for the customer is automatically limited to a tan level exactly one level greater than the tan level associated with a previous tanning session of the customer.

Still other desirable features of the invention will become apparent to those of ordinary skill in the art upon reading and understanding the following detailed description, taken with the accompanying drawings, wherein like reference numerals represent like elements throughout.

DESCRIPTION OF THE PREFERRED EMBODIMENTS

The present invention will now be described with reference to the accompanying figures. It is to be understood that the specific system illustrated in the attached figures and described in the following specification is simply an exemplary embodiment of the present invention. Hence, specific dimensions and other physical characteristics related to the embodiments disclosed herein are not to be considered as limiting.

Figure 1:
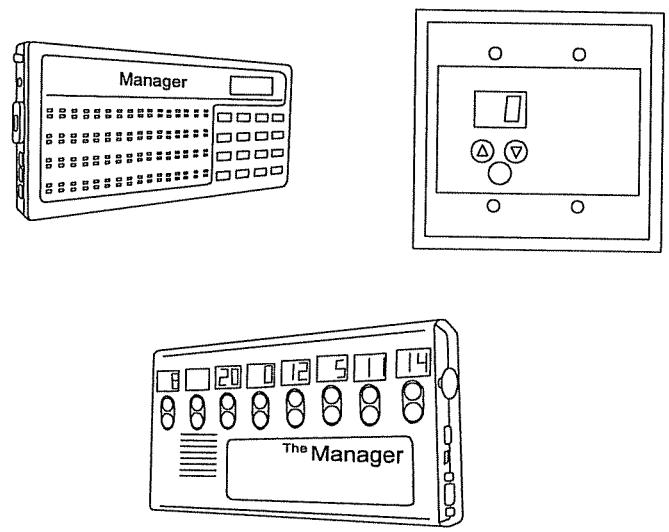
FIG. 1 is a depiction of a prior art tanning timer system.

With reference to FIGS. 1-12, in a desirable embodiment, the overall system includes various hardware entities and subsystems communicatively connected to each other. Generally, the system includes a customer information manager, one or more kiosks, a T-Max® Manager system or other suitable timer managing system, and an actual timer to turn on a tanning bed, such as a T-Max® 3A timer. The T-Max® Manager system and the T-Max® 3A timer are manufactured by Applied Digital, Inc. of Branson West, Mo. The customer information manager is configured to store various personal information of a customer, including contact and billing information. The T-Max® Manager is a front desk control unit that may be connected to the various T-Max® 3A timers situated in each tanning bed room. As shown in FIG. 1, a display of such a control unit includes LEDs along the top thereof with a Start/Stop and a Set button below each display. A vertical row of LEDs along the left side indicates which bank of beds is being displayed. The control unit can be used manually or may be controlled with a PC using suitable tanning software. Information such as session counts, lamp hours, and bed hours can be monitored and changed either with a PC or using the T-Max® Manager manually. As is known in the art, the T-Max® 3A timer situated in each tanning bed room may be configured to start the tanning bed if the customer is ready before the default five minute delay.

Figure 2:
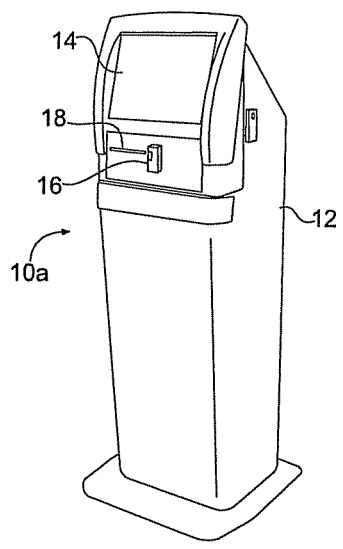
FIG. 2 is perspective view of a floor-based kiosk in accordance with the present invention.
Figure 3:
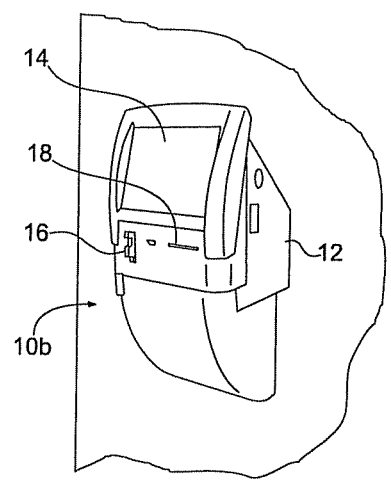
FIG. 3 is a perspective view of a wall-mounted kiosk in accordance with the present invention.

The interactive kiosk of the present invention may be embodied in various physical configurations. For example, FIGS. 2 and 3 show a floor-based kiosk 10a or wall-mounted kiosk 10b, respectively, herein collectively referred to as the kiosk 10. Desirably, the kiosk 10 includes a housing 12 for containing various components therein or attaching components thereto. It is to be understood that the size, shape, and material of the housing 12 may be of any suitable type. Although not shown, the housing 12 may include mounting hardware for receiving or supporting the components. Generally, the kiosk 10 includes a display 14 with which a customer may interact. One such display may be a visual touch-screen or touch-screen overlay positioned over an existing non-touch screen display. However, it is to be understood that the display 14 may be of various types, such as LCD or CRT and that in an alternative embodiment, the touch-screen virtual inputs may be mapped to physical buttons integrated into the kiosk 10. The kiosk 10 may also include an identification mechanism 16 for receiving identifying information directly or indirectly from a customer. Identification mechanisms 16 include, but are not limited to, a card swipe reader, data card slot (e.g., flash memory), RFID tag reader, and thumbprint or retinal scanner, for example. The kiosk 10 may also include an acceptor/dispenser 18 for accepting cash (e.g., bill denominations) and/or dispensing printed material, such as receipt, membership, or promotional information. It is to be understood that the acceptor/dispenser may be embodied as two distinct mechanisms.

The kiosk 10 includes a computing device having the necessary instructions for implementing the functional operation of the kiosk 10. To this end, the kiosk 10 includes a processor, memory, and storage medium for storing and executing the instructions along with related customer data. Exemplary storage mediums include, but are not limited to, volatile/non-volatile RAM, flash memory, a hard disk drive, an optical drive, or other suitable storage mediums. Customer data may be stored in a database structure or other suitable format, as would be readily understood by persons having ordinary skill in the art. It is to be understood that the computing device may be embodied as a specialized computing device (e.g., dedicated machine with a hard-coded processor) or a general purpose computer having a standard operating system (e.g., Windows) with specialized software running thereon. Aside from providing the user-interface with the customer, the software is configured to communicatively interface with the T-Max® Manager, or other suitable timer managing system.

Figure 4:
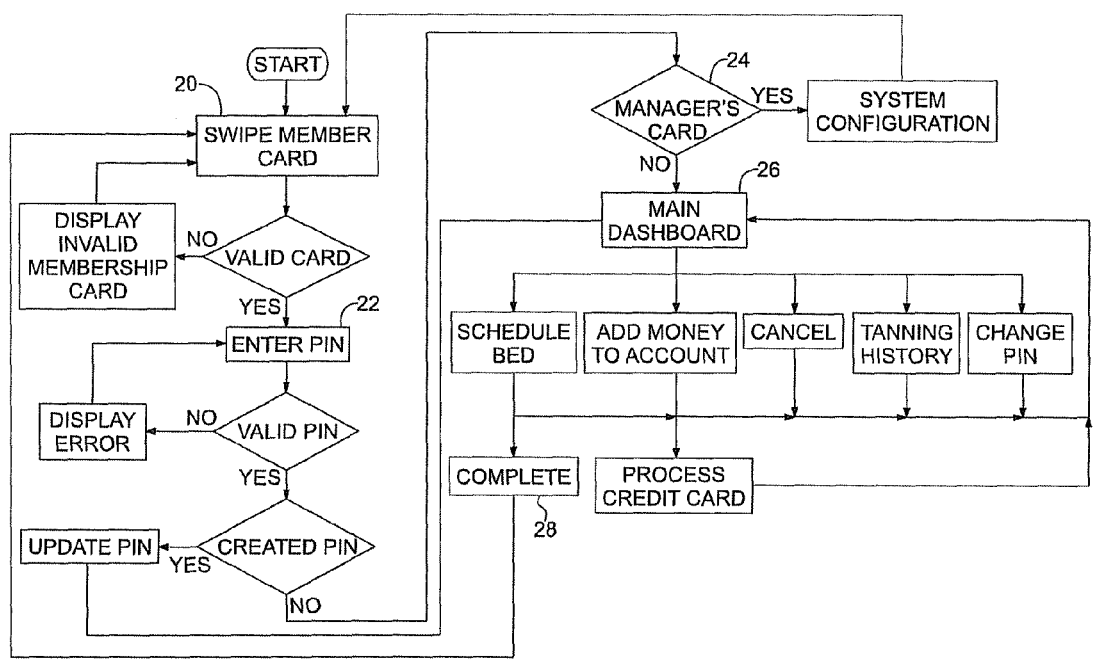
FIG. 4 is flowchart outlining the operational sequence of the kiosks of FIG. 2 or 3.

A desirable functionality of the present invention will now be discussed in connection with the flowchart outlining the operational sequence of the kiosk 10 shown in FIG. 4 and the kiosk screen shots depicting customer and tanning-related information shown in FIGS. 5-12.

Figure 5:
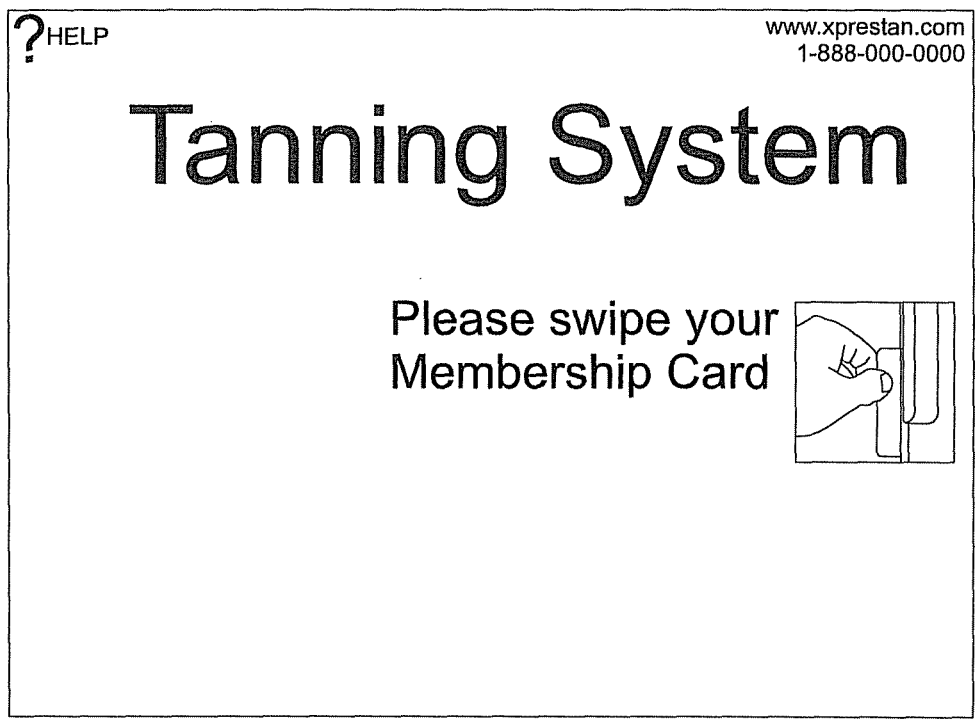
FIG. 5 is an introduction screen shot of display of the kiosks.

As shown in block 20, a customer swipes her card at the instruction of an introductory screen shown on the display 14, as shown in FIG. 5. Thus, it is to be understood that each customer has been previously issued her own identification card for use with the system. Salon owners may customize a minimum session time depending on each customer's skin type or tanning history in order to prevent any overexposure to the customer. To this end, the software may include various tanning levels or programs that may be set and/or predefined. For example, a first level may include 5-7 minutes of tanning time, a second level may include 8-10 minutes of tanning time, and a third level may include 11-15 minutes of tanning time. After a level is associated with each card and, thereby, each customer, the subsequent levels will increase based upon the previously defined intervals of tanning time for that particular customer.

Figure 6:
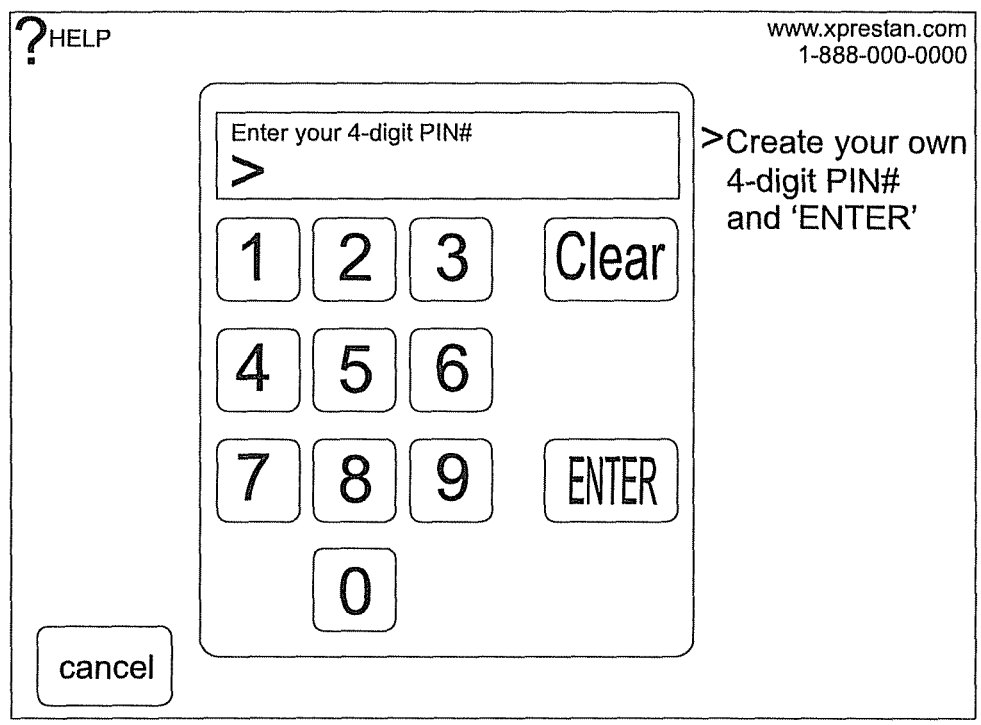
FIG. 6 is a PIN entry screen shot of the display of the kiosks.

Desirably, each customer may establish a PIN to be associated with her account. Thus, as shown in FIG. 6, a PIN entry screen may be shown so that at block 22 the customer is instructed to enter their PIN. A verification routine follows to authenticate the user. As indicated at block 24, a salon owner or manager may access a system configuration or override portion of the system by sliding her own card through the card swipe reader. The system configuration portion of the system may allow the manager to customize payment types and costs, available beds, etc.

Figure 7:
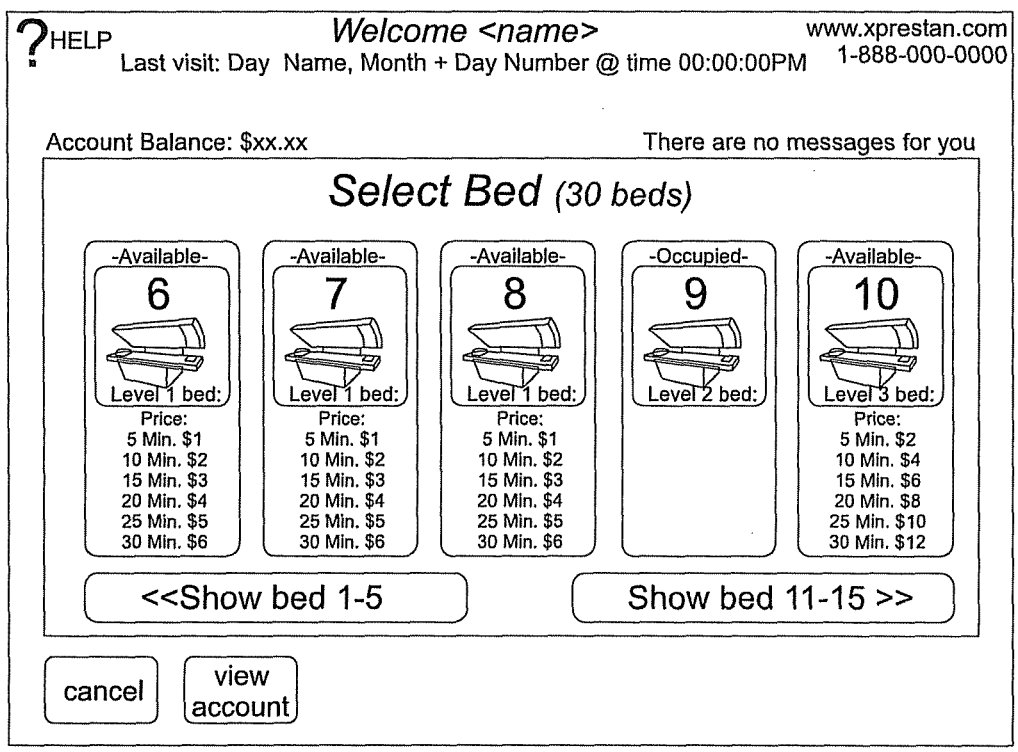
FIG. 7 is a bed selection screen shot of the display of the kiosks.

As shown in block 26, after a customer has been verified, a main menu, or dashboard may be displayed that provides access to various features of the system. In one embodiment, the dashboard may offer the options of scheduling a bed, adding money to the customer's account, reviewing the customer's tanning history (e.g., date of last tan, intensity thereof), changing the customer's PIN, and renewing the customer's membership, as partially shown in the screen shot of FIG. 11. Upon selection of the bed selection option, the kiosk 10 may visually identify which beds are available and which are unavailable. For example, the customer may be presented with a series of visual representations of the available tanning beds and the levels (e.g., intensity), pricing, and availability associated with each bed, as shown in FIG. 7. In one embodiment, availability status indication may be accomplished by text or red framing around the visually depicted beds. The beds may be generically depicted or may be realistic in appearance. Timers indicating the amount of time remaining may also be visually presented.

Figure 8:
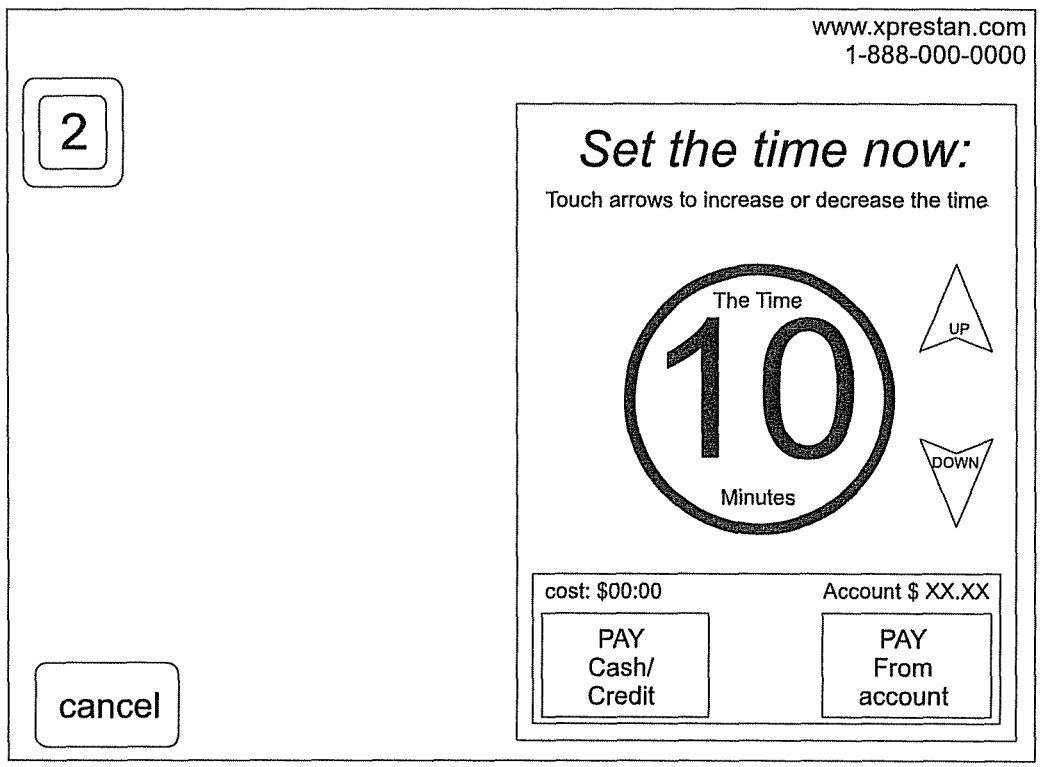
FIG. 8 is a time selection screen shot of the display of the kiosks.
Figure 9:
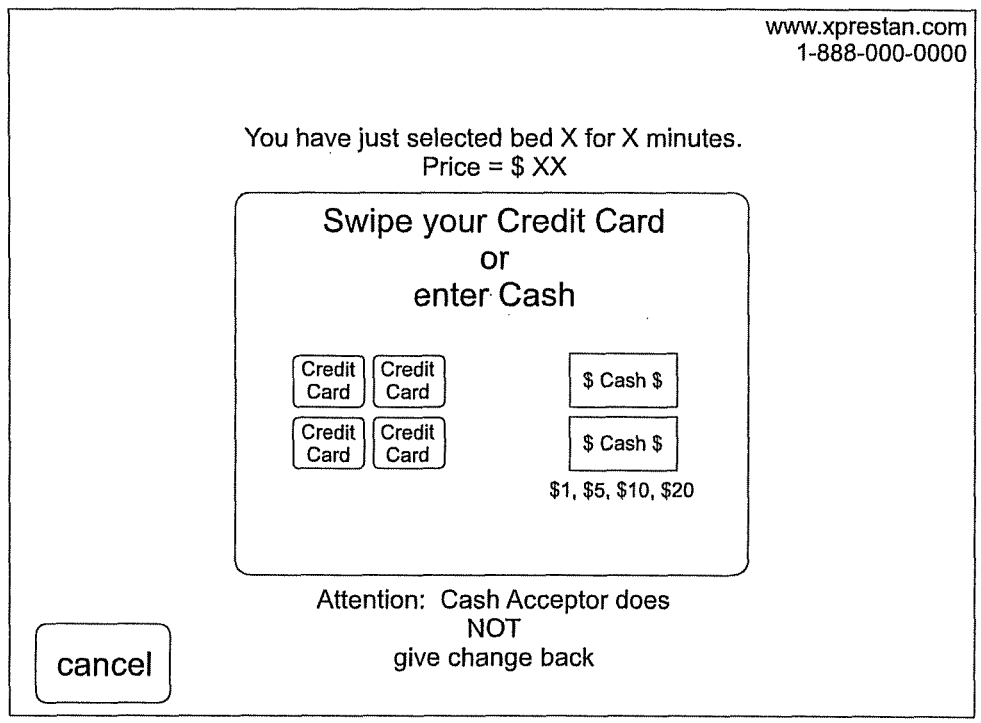
FIG. 9 is a payment selection screen shot of the display of the kiosks.
Figure 10:
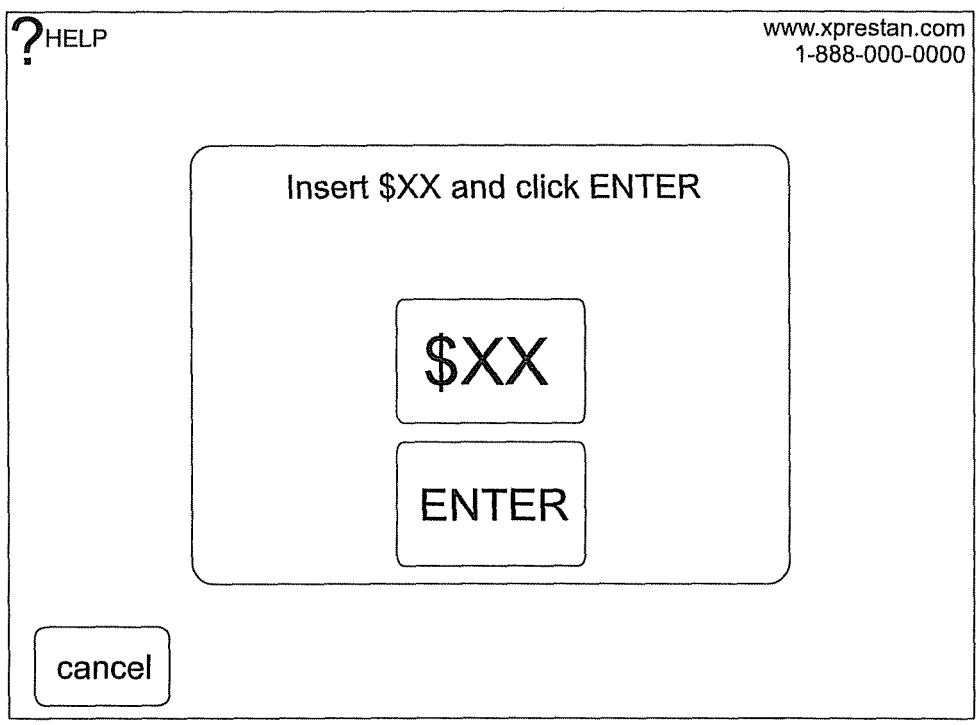
FIG. 10 is a payment acceptance screen shot of the display of the kiosks.
Figure 11:
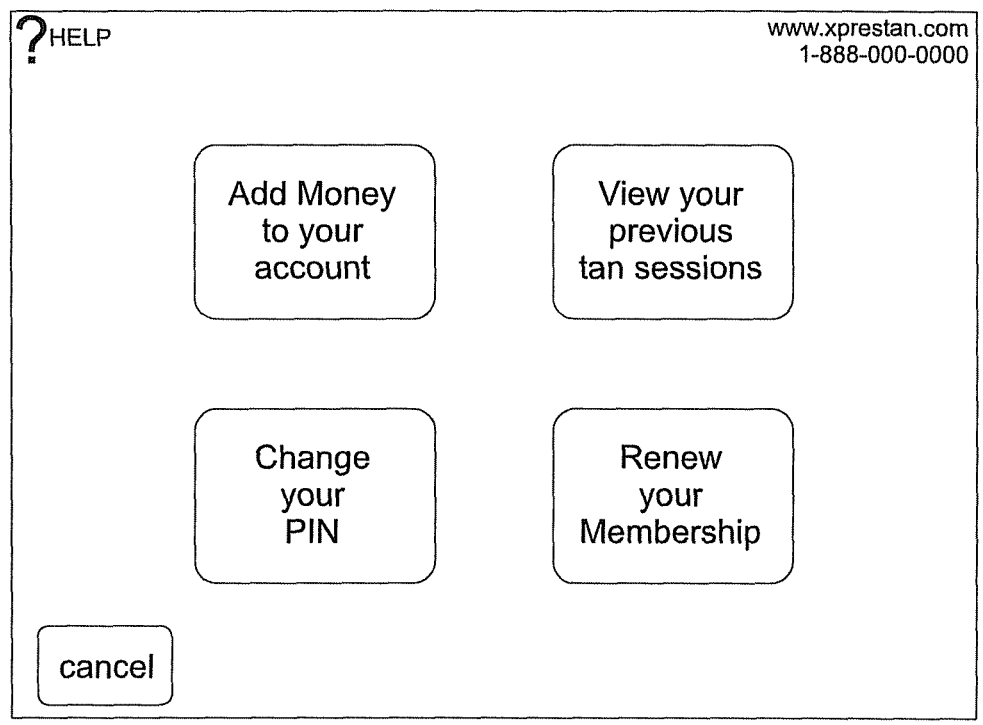
FIG. 11 is a customer informational menu screen shot of the display of the kiosks.
Figure 12:
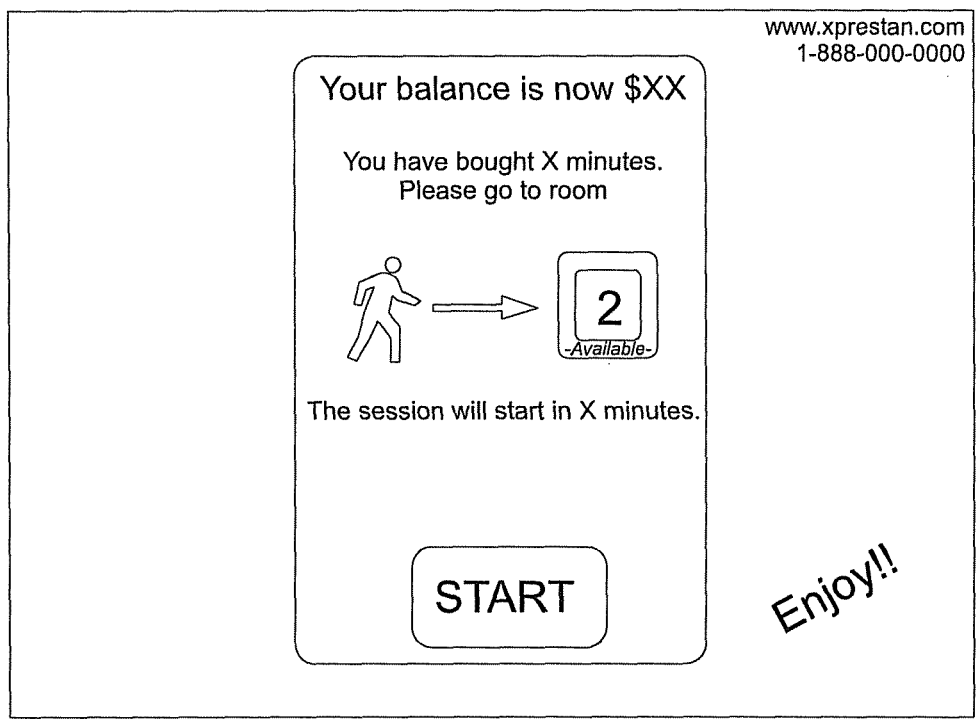
FIG. 12 is a customer tanning session directive screen shot of the display of the kiosks.

After a selection of a bed, a time selection screen may be displayed allowing the customer to select the amount of time they wish to use the selected bed, as shown in FIG. 8. Thereafter, the customer may be presented with a payment selection screen, as shown in FIG. 9. Payment at the kiosk 10 for usage of the system may be with cash, credit cards, or any other suitable form of payment. For example, if the customer indicates payment by credit card, then the customer can slide her card through the card swipe reader. Alternatively, if payment is to be made via cash, that the customer can insert the appropriate denomination into the bill acceptor. The required denomination may be indicated on a payment acceptance screen, as shown in FIG. 10. In response to the appropriate payment being made, a customer tanning session directive screen may be displayed that instructs the customer to use the previously selected tanning bed, which completes the operational sequence, as shown in block 28. Additional information such as how much time is available to prepare before the tanning bed session begins may also be presented to the customer at this time. In a desirable embodiment, after the customer has selected a bed and made any modifications with respect to tanning time, a 'Start' button (or similar initiating input) may be visually presented on the display 14. Upon pressing this button, a five minute delay is initiated with respect to starting of the tanning bed. The customer may also be informed regarding her remaining balance if a prepaid account was used as payment. Thereafter, the customer enters the tanning bed to begin her tanning session. The software is configured to control the length of the tanning session at all times, in order to avoid any possible overexposure.

Customers may pay for individual sessions or load up their account with a set amount of money from which the cost of each session may be deducted. In one embodiment, an account may be linked to a family plan in which all family members' tanning session costs are deducted from that same account. In the event that a customer loses her card that has money banked in their account, the salon owner may access the account when provided with the customer's PIN. Accordingly, the lost card may be cancelled and the balance may be transferred to a new card. In a desirable embodiment, the customer will pay an annual membership fee for use of the tanning facilities. Any renewal of membership may be transacted at the kiosk 10. The system may be configured to transmit an email reminder 30 days, for example, prior to expiration of a membership. The system may implement a grace period in the event that a customer attempts to tan after her membership has expired.

The present invention provides inherent safety features with respect to controlling tanning times. The system is aware to what extent, if any, each customer has previously tanned. As a customer progressively tans, the maximum allowed session would gradually increase by the predefined intervals of tanning time. In other words, a new customer who has not recently tanned would not be allowed to tan at tanning levels deemed appropriate only for already-tanned customers. Furthermore, if a customer stops tanning longer than a month (or any other predefined length of time), the system may automatically decrease the customer's maximum session time to avoid burning. For example, if a customer was at the third level of 11-15 minutes, the customer will then be limited to the second level of 8-10 minutes, until a satisfactory progression of tanning has been established. This step-down feature may be manually overridden by the salon owner if it has been established that the customer has recently tanned at another tanning salon. The salon owner may customize the system according to the regulations of the state in which the system is situated. For example, some states allow tanning only once every 24 hours or only once every 48 hours. Thus, if a customer attempts to tan beyond the allotted per-session state mandated interval, the kiosk 10 may refuse to turn on the tanning bed. Additionally, a warning may appear indicating such condition and informing the customer when she may tan next.

It is to be understood that system may be networked over a local or distributed network. In other words, multiple kiosks 10 within one store may be connected to each other or kiosks 10 located across separate salons may be connected to each other. For example, a customer may use their card at any location, with the system being aware of all information pertaining to that account regardless of which salon the customer uses for tanning. Thus, it is to be understood that the kiosk 10 may include the appropriate hardware and software to support networking connectivity and operation.

It is envisioned that the kiosk 10 may be configured to display either targeted or generic advertising, which may be for the salon or third parties. The kiosk 10 may be configured to send out emails containing coupons after a customer spends a predefined amount of money on tanning or related products. Such coupons may also be provided on special occasions, such as a customer's birthday. The kiosk 10 may also be configured to dispense coupons or other promotional material via its dispenser 18. Thus, if a coupon for a tanning product is dispensed at the time of transacting a tanning session, the customer can redeem the coupon prior to her session starting so that the discounted product may be used in connection with her selected tanning session.

It is to be understood that due to the automation of the aforementioned invention, the staffing of a tanning salon may be reduced.

The invention has been described with reference to the desirable embodiments. Modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A method of providing a customer with a tanning session in accordance with a regulated tanning interval schedule, the method comprising:
   (a) providing a tanning system having at least a first, a second and a third tanning intensity
      (i) wherein the first, second and third tanning intensity correspond with (1) a first, second, and third tanning bed, respectively, (2) a first, second, and third strength of bulbs, respectively, and (3) first, second and third tanning duration, respectively, and
      (ii) wherein the first tanning duration is shorter than the second tanning duration, and the second tanning duration is shorter than the third tanning duration;
   (b) identifying the customer;
   (c) identifying whether the customer used the first, second, or third tanning bed during a previous tanning session and identifying a tanning duration used with the identified first, second, or third tanning bed; and
   (d) initiating the tanning session in accordance with the regulated tanning interval schedule establishing that the customer be permitted to use by limiting the tanning duration for the selected bed to:
      (i) a first tanning duration if the customer did not use the first, second or third tanning bed during the previous tanning session;
      (ii) the first or a second tanning duration if the customer used the first tanning duration during the previous tanning session;
      (iii) the first, second, or a third tanning duration if the customer used the second tanning duration during the previous tanning session; and
      (iv) the first, second, or a third tanning duration if the customer used the third tanning duration during the previous tanning session.

2. The method of claim 1, further comprising the step of determining that if the customer uses the first, second, or third tanning duration within a predetermined time after the previous tanning session, then not permitting the customer to use the first, second, and third tanning duration.

3. The method of claim 2, wherein the predetermined time is 24 hours or 48 hours.

4. The method of claim 1, further comprising the step of overriding the regulated tanning interval schedule by an operator of the tanning system if the customer establishes that the previous tanning session occurred at a different salon location from that where the first, second, and third tanning bed are located.

5. The method of claim 3, further comprising the step of indicating to the customer when the customer is permitted to use the first, second, and third tanning duration based upon a determination of when the predetermined time will have elapsed.

6. The method of claim 1, further comprising the step of determining that if the previous tanning session occurred more than a predetermined time prior to the tanning session to be initiated, automatically decreasing a customer-selectable duration of time associated with the tanning session.

7. The method of claim 6, wherein the predetermined time is at least one month.

8. The method of claim 1, further comprising the step of indicating to the customer if the first, second, or third tanning duration are available to the customer.

9. The method of claim 1, wherein the step of identifying the customer is performed by reading customer identification information from an identification card scanned by the customer.

10. A system for providing a customer with a tanning session in accordance with a regulated tanning interval schedule comprising:
    (a) a tanning system having a first, second and third tanning intensity
       (i) wherein the first, second and third tanning intensity correspond with (1) a first, second, and third tanning bed, respective, (2) a first, second and third strength of bulbs, respectively, and (3) a first, second and third tanning duration, and
       (ii) wherein the first tanning duration is shorter than the second tanning duration, and the second tanning duration is shorter than the third tanning duration;
    (b) means for identifying a customer;
    (c) identifying whether the customer used the first, second or third tanning bed during a previous tanning session;
    (d) and identifying whether the customer used a first, second, or third tanning duration during a previous tanning session; and
    (ii) means for displaying a user interface to the customer and receiving input therefrom;
    (iii) means for processing a form of payment provided by the customer to cover the cost associated with the tanning session; and
    (iv) means for initiating the tanning session in accordance with the regulated tanning interval schedule establishing that the customer be permitted to use by limiting the tanning duration for the selected bed to:
       (1) a first tanning duration if the customer did not use the first or the second tanning bed during the previous tanning session;
       (2) the first or a second tanning duration if the customer used the first tanning duration during the previous tanning session;
       (3) the first, second, and a third tanning duration if the customer used the second tanning duration during the previous tanning session; and
       (4) the first, second, and third tanning duration if the customer used the third tanning duration during the previous tanning session, wherein the first tanning duration is shorter than the second tanning duration and the second tanning duration is shorter than the third tanning duration.

11. The system of claim 10, further comprising means for dispensing a coupon after the system has determined that the customer has paid for a predetermined amount of tanning sessions using the system or has spent a predetermined amount of money via the system.

12. The system of claim 10, wherein the means for displaying a user interface to the customer is configured to display advertising.

\* \* \* \* \*

UNITED STATES PATENT AND TRADEMARK OFFICE
CERTIFICATE OF CORRECTION

| | |
|---|---|
| PATENT NO. | : 8,812,357 B2 |
| APPLICATION NO. | : 12/432445 |
| DATED | : August 19, 2014 |
| INVENTOR(S) | : Tracy Hughes |

It is certified that error appears in the above-identified patent and that said Letters Patent is hereby corrected as shown below:

In the Claims

Column 8, Line 27, Claim 10, delete "respective," and insert -- respectively, --

Signed and Sealed this
Twenty-sixth Day of May, 2015

Michelle K. Lee
*Director of the United States Patent and Trademark Office*